United States Patent [19]

Fitzpatrick

[11] 4,351,079
[45] Sep. 28, 1982

[54] SPHERE LAUNCHING AND RECEIVING VALVE

[75] Inventor: John R. Fitzpatrick, Tulsa, Okla.
[73] Assignee: Fitzpatrick Associates, Inc., Tulsa, Okla.
[21] Appl. No.: 46,863
[22] Filed: Jun. 8, 1979
[51] Int. Cl.³ .............................................. B08B 9/04
[52] U.S. Cl. .............................. 15/104.06 A; 251/298
[58] Field of Search ............... 15/104.06 R, 104.06 A; 251/298; 137/268

[56] References Cited

U.S. PATENT DOCUMENTS

| | | | |
|---|---|---|---|
| 1,636,461 | 7/1927 | Colburn | 251/298 |
| 3,166,094 | 1/1965 | Eagleton | 15/104.06 A X |
| 3,169,263 | 2/1965 | Eagleton | 15/104.06 A |
| 3,266,077 | 8/1966 | Elliott et al. | 15/104.06 A |
| 3,521,659 | 7/1970 | Seger | 251/298 X |
| 3,809,113 | 5/1974 | Grove et al. | 15/104.06 A |

FOREIGN PATENT DOCUMENTS 2351332  12/1977  France .............................. 251/298

*Primary Examiner*—Edward L. Roberts
*Attorney, Agent, or Firm*—Head & Johnson

[57] ABSTRACT

A valve which may be interposed in a pipeline system in such a manner for injecting or launching of spheres into the interior of the pipeline individually and in sequence, and which may be alternatively interposed in the system for receiving previously injected spheres from the interior of the pipeline. The valve comprises a launch mechanism actuated by gravity and which has a single moving part, and in the receiving operation a blocking bar is provided for precluding incoming spheres from inadvertently or accidentally lodging within the valve body.

6 Claims, 8 Drawing Figures

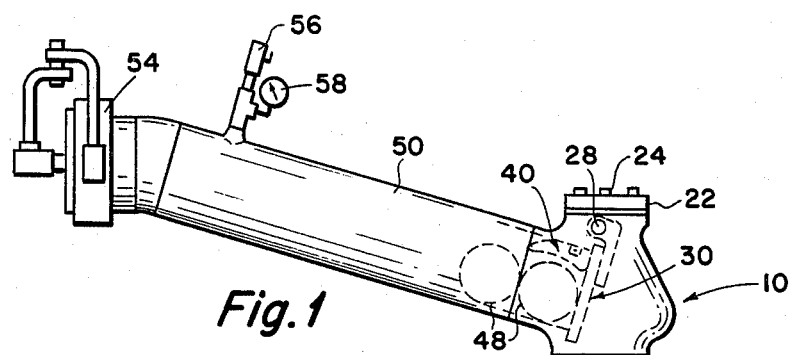
Fig.1
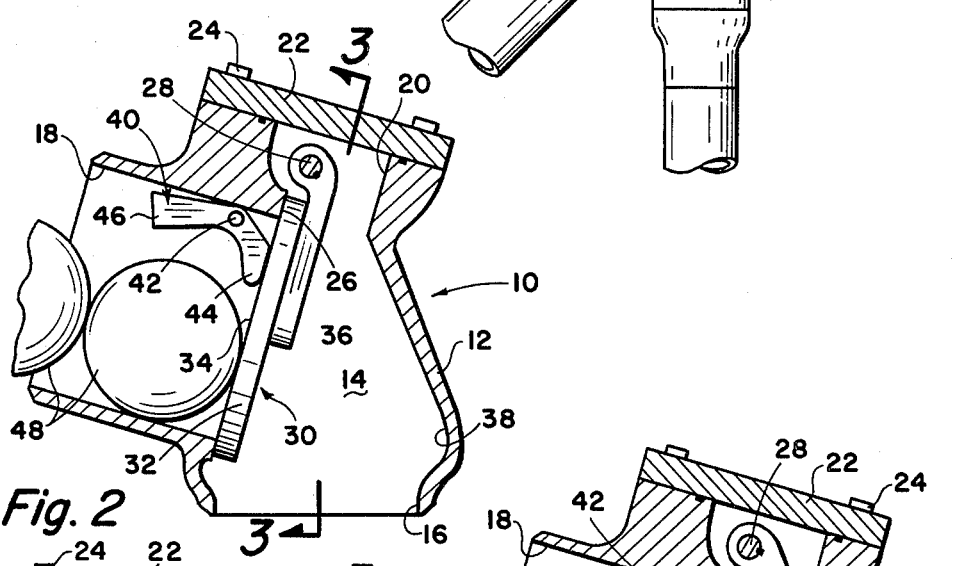
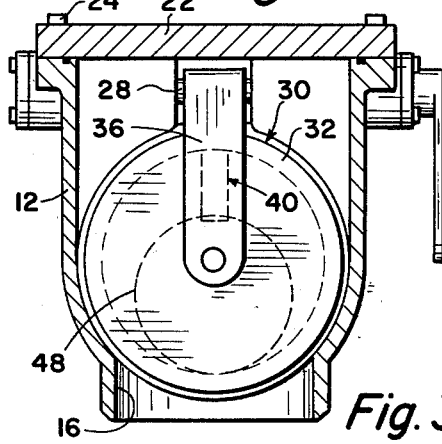
Fig.3
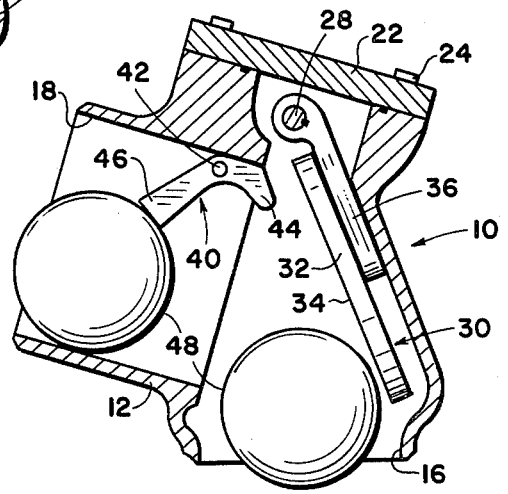
Fig.4

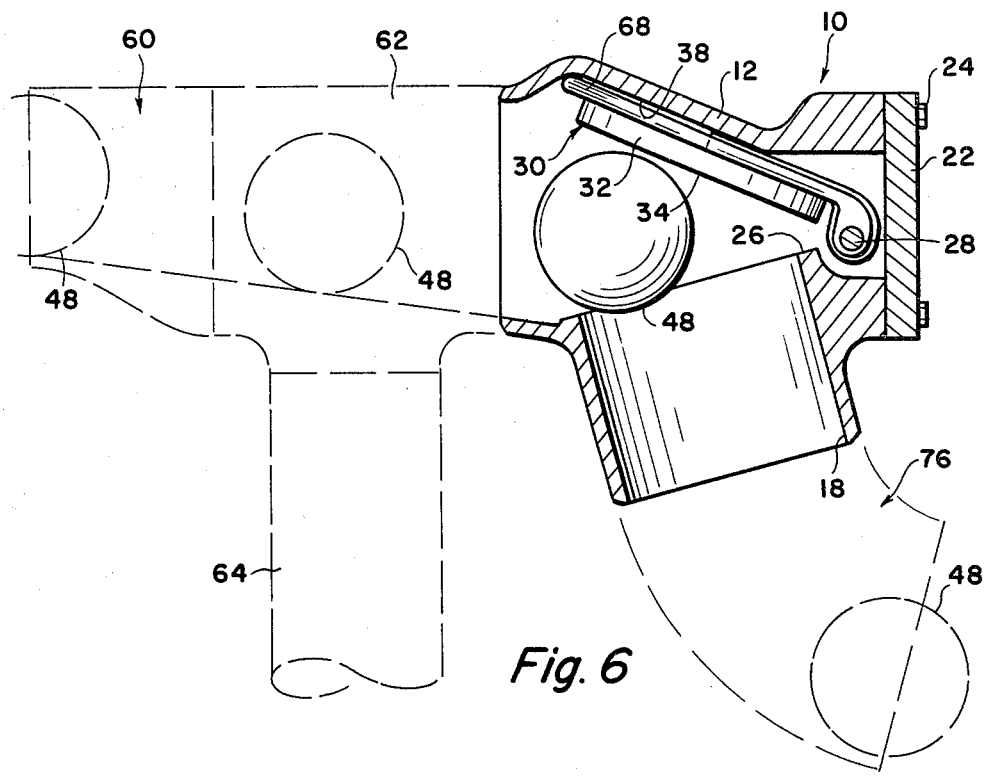
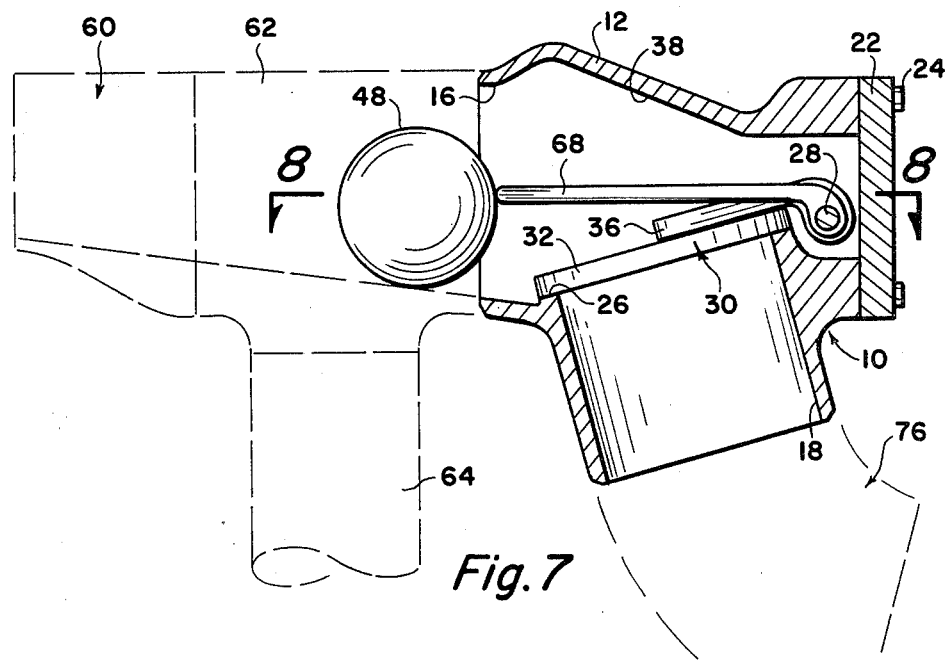

SPHERE LAUNCHING AND RECEIVING VALVE

BACKGROUND OF THE INVENTION

1. Field of the Invention

This invention relates to improvements in sphere launching and sphere receiving apparatus and more particularly, but not by way of limitation, to a single valve which may be utilized for both a launching operation or a receiving operation.

2. Description of the Prior Art

Pipelines are in widespread use today for delivering or transporting fluid products from site to site, such as gas and oil products from an oil well site to a handling plant. The movement of many products through the line, and particularly natural gas, presents many problems, and one particularly difficult problem is the handling of the condensation in the pipeline as the gas stream flows therethrough. The condensation collects in each of hundreds of sags inherent in a pipeline crossing a rolling countryside. The gasoline of fluid contained within each sag becomes an impediment to the flow of the gas stream through the pipeline. In order to move this condensate through the pipeline, it has become increasingly desirable to move a spheroid, or pipeline pig, through the pipeline to force the condensate therethrough. The pig is normally propelled through the pipeline by the pressure of the gas stream itself, and has proven to be an expedient means for solving the problem.

A pipeline usually comprises a plurality of progressively larger or smaller diameter pipe sections, and it is desirable to inject a pig or spheroid at multiple intervals along the pipeline in accordance with the diameter variances therein. Thus, it is necessary to provide apparatus for launching of the sphereoids at spaced intervals along the pipeline, as well as apparatus for receiving the previously injected sphereoids. In addition, the pipeline extends through long distances over the countryside or open spaces and is frequently unattended, and it is desirable to provide an automatic launching means at the desired intervals along the pipeline for injecting the spheroids into the interior thereof.

Many devices, such as that shown in the H. N. Eagleton Pat. Nos. 3,166,094, issued Jan. 19, 1965, and entitled "Receiving Valve," and 3,169,263, issued Feb. 16, 1965, and entitled "Sphere Launching Apparatus" have been developed for the injecting and removing of spheres from the pipeline, but these devices have certain disadvantages in that completely different and distinct valves must be provided for the two functions, and in addition, the devices are somewhat complicated and expensive in use and construction.

SUMMARY OF THE PRESENT INVENTION

The present invention contemplates a novel sphere launching and receiving apparatus wherein a common valve structure may be utilized for both the launching operation and the receiving operation. The launching mechanism is a gravity actuated device comprising a single moving part, and is particularly designed and constructed for precluding the injecting of more than one sphere at a time during a launching operation. A blocking bar is provided with the launching mechanism to preclude any accidental lodging of sphere in the valve body during receiving operations. The valve bodies of both the launcher and receiver are substantially identical, thus providing for interchangeability with only a minor modification. The devices may be utilized in a manual operation system, or may be arranged for automatic operation in accordance with a timed cycle or a sequential control, as desired. The novel valve is simple and efficient in operation and economical and durable in construction.

BRIEF DESCRIPTION OF THE DRAWINGS

FIG. 1 is a side elevational view of a launcher-receiver valve embodying the invention and illustrated as installed for a sphere launching operation.

FIG. 2 is a sectional elevational view of a launcher-receiver valve embodying the invention, and illustrated in a position for blocking the entry of spheres into a pipeline during a sphere launching operation.

FIG. 3 is a sectional view taken on line 3—3 of FIG. 2.

FIG. 4 is a view similar to FIG. 2 and illustrates a sphere launching operation.

FIG. 6 is a sectional elevational view of a launcher-receiver valve embodying the invention, and illustrated in a position for receiving a sphere from the pipeline during a receiving operation.

FIG. 7 is a view similar to FIG. 6 and illustrates a blocking operation for precluding lodging of a ball in the valve body during a sphere receiving operation.

DESCRIPTION OF THE PREFERRED EMBODIMENT

Figure 5:
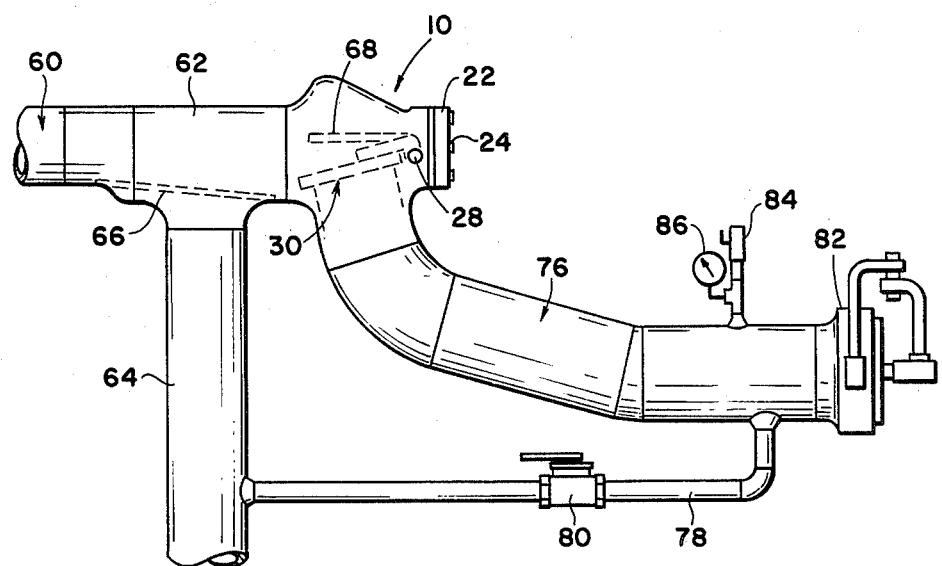
FIG. 5 is a side elevational view of a launcher-receiver valve embodying the invention and illustrated as installed for a sphere receiving operation.

Referring to the drawings in detail, and particularly FIGS. 1, 2 and 3, reference character 10 generally indicates a launcher-receiver valve comprising a valve body 12 of a contorted substantially L-shaped general configuration having an internal chamber 14 therein providing communication between a first port 16 and a second port 18. An access port 20 is also provided in the body 12 and extends into communication with the chamber 14 for a purpose as will be hereinafter set forth. A cover plate 22 is removably secured to the access port 20 in any suitable manner such as a plurality of spaced bolts 24, as is well known.

An annular shoulder 26 is provided on the inner periphery of the body 12, and is disposed inwardly of the port 18 as particularly seen in FIGS. 2 and 4, and provides a valve seat for the valve 10. A pivot shaft 28 extends across the access port 20 in a direction substantially perpendicular to the axis of the port 18 for pivotally securing a closure member 30 within the chamber 14. The closure member 30 comprises a substantially flat disc or plate member 32 having one face 34 adapted for selective engagement with the valve seat 26 for opening and closing of the valve 10, as will be hereinafter set forth. A suitable arm member 36 is welded or otherwise secured to the opposite face of the disc 32 and extends radially outwardly therefrom for connection with the shaft 28 in any suitable well known manner. The arm 36 may be pivotally secured around the outer periphery of the shaft 28 for rotation with respect thereto, or may be keyed or otherwise secured to the shaft 28 for rotation simultaneously therewith, as desired. It is usually preferable, however, that the shaft 28 be suitably journalled in the body 12 for rotation about its own longitudinal axis, and may be provided with an externally disposed operator (not shown) for either automatic rotation or manual rotation thereof, as will be hereinafter set forth in detail.

The body 12 is enlarged at 38 at a position substantially oppositely disposed with respect to the valve seat 26 to provide sufficient clearance for the closure member 30 during opening of the valve 10 in order to preclude interference with the passageway through the valve 10 in order to permit a substantially full opening of the valve for unrestricted flow between the ports 18 and 16 for a purpose as will be hereinafter set forth. In addition, a launch lever 40 is pivotally secured within the body 12 and interposed between the open end of the port 18 and the valve seat 26, as shown at 42. The lever 40 is of a substantially open V-shaped configuration, with the apex of the Vee being at the pivot connection point 42. In the closed position of the valve 10 as shown in FIG. 2, one leg 44 of the lever 40 normally engages the face 34 of the disc 32, and in the open position of the valve 10, the leg 46 of the lever 40 falls or rotates about the pivot 42 by gravity in a counterclockwise direction and into a position extending into the passageway between the port 18 and valve seat 26 as particularly shown in FIG. 4. The construction of the lever 40 is particularly selected for movement by gravity, thus eliminating additional working parts for the valve 10.

In operation, the valve 10 may be interposed in a pipeline system at substantially any desired location therealong, as is well known, for launching or injecting spheres or pigs 48 into the interior of the pipeline. As shown in FIG. 1, the valve 10 is preferably interposed between a storage barrel 50 and a pipeline entry coupling 52 with the port 18 being in open communication with the interior of the barrel 50 and the port 16 being in open communication with the coupling 52. The barrel 50 may be of any suitable type and is normally supported at an angular position with respect to the horizontal whereby the outer end thereof is at a higher elevation than the inner end thereof, as particularly shown in FIG. 1. The barrel 50 functions as a launching tube and receives a plurality of the spheres 48 through the outer end thereof as is well known. The outer end of the barrel 50 is preferably provided with a suitable end closure member 54 of any well known type which provides for selective opening of the outer end of the barrel whereby the spheres 48 may be inserted into the interior of the barrel. In addition, it is preferable to provide a suitable blow down valve 56 in communication with the interior of the barrel 50 downstream of the closure member 54 for relieving the internal pressure of the barrel 50 prior to opening of the closure member 54, as is well known. It is also preferable to provide a suitable pressure gauge 58 disposed exteriorly of the barrel 50 and in communication with the interior thereof for providing a visual determination of the internal pressure thereof. It is the usual practice to provide a suitable valved bypass conduit (not shown) extending between the upstream side of the closure member 30 and the downstream side thereof for equalizing the pressure on the opposite sides of the closure member 30 during operation thereof.

As hereinbefore set forth, the valve 10 may be either manually or automatically opened and closed, as is well known. In any event, the pivot shaft 28 normally extends beyond the outer limit of the valve body 12 and carries an operator (not shown), which may be a lever, or the like, for moving the closure member 30 between the opened and closed positions thereof. In the event the operator is manually actuated, the lever may be manually moved to the selected position for either opening or closing of the valve closure 30, and suitable locking means is provided, such as a locking pin engageable with the operator, for securely locking the operator in the selected position, thus assuring either an open or closed position for the closure member 30 in accordance with the operating procedure.

Prior to a sphere launching operation, the closure member 30 is normally maintained in the closed position shown in FIGS. 1 and 2, thus closing communication between the interior of the barrel 50 and the coupling 52 and precluding passage of any spheres 48 from the barrel 50. In the event it is desirable to gain access to the interior of the barrel 50 for any reason, such as for placing additional spheres therein, the blow down valve 56 may be utilized in the normal manner for relieving the pressure within the barrel. The gauge 58 provides a visual indication of the internal pressure of the barrel, and upon attaining a safe pressure, such as a pressure substantially equal to atmospheric pressure, the end closure member 54 may be opened for providing access through the outer end of the barrel 50. Any spheres 48 disposed within the barrel roll downwardly therein in a direction toward the closed closure member 30 due to gravity, with each succeeding sphere resting against the preceding sphere within the barrel. Upon the closing of the end closure member 54, the pressure within the barrel 50 may be equalized with the pressure within the coupling 52, which is the same as the internal pressure of the pipeline, by opening the valved bypass line (not shown) to permit the line pressure to enter the barrel. In this manner the pressures acting on the closure member 30 are equalized, thus facilitating the opening and closing thereof.

When it is desirable to insert or inject a sphere 48 into the coupling 52 and subsequently into the pipeline, the operator means (not shown) is activated for moving the closure member 30 from the closed position shown in FIG. 2 to the open position therefor as shown in FIG. 4. This movement releases the initial sphere 48 within the barrel 50 for discharge through the port 16 for injection into the coupling 52 and into the pipeline. Simultaneously with the release of the initial sphere from the barrel 50, the latch mechanism pivots in a counterclockwise direction about the pivot 42 by gravity to the position shown in FIG. 4. The outer end of the leg member 46 engages the second or next succeeding sphere 48 and precludes any further movement thereof, thus positively avoiding the discharge of more than a single sphere 48 into the coupling 52 during each opening of the valve 10.

Subsequent to the discharge of the single sphere 48 from the barrel 50, the closure member 30 is moved to the closed position thereof, and as the closure member 30 approaches the valve seat 26, the face 34 thereof engages the outer end of the leg 44 of the latch mechanism 40 and pivots the latch in a clockwise direction about the pivot 42 and to the position shown in FIG. 2. The leading sphere now remaining in the barrel 50 then moves downwardly by gravity through a relatively slight distance and into engagement with the closed closure member 30.

As hereinbefore set forth, the actuator (not shown) for the opening and closing of the closure member 30 may be of the well manual type or automatic type. The automatic actuators may be either adapted for function in accordance with a sequence control, or may be adapted for actuation through a time cycle control as desired. In any event, upon each opening of the closure member 30, only a single sphere is released for injection into the pipeline. Of course, the recess portion 38 in the housing 12 provides clearance for the disc member 32 during opening of the valve 10 in order that an unobstructed passageway is provided between the ports 16 and 18 during opening of the valve.

Referring now to FIGS. 5 through 8, the valve 10 is shown installed for receiving operation. For this use or operation of the valve 10, the valve body 12 is interposed in the pipeline system in a substantially reverse manner as in the sphere launching operation. The pipeline is usually or generally provided with an above-ground portion in the proximity of the site for withdrawal of the spheres therefrom, as indicated at 60 in FIG. 5. A Tee-fitting 62 may be welded or otherwise suitably secured to the open end of the portion 60, and in communication with the interior for receiving the spheres therein. As is well known, one leg of the Tee 62 is secured to the portion 60 and the valve body 12 is preferably secured to the oppositely disposed leg thereof. A return conduit or pipe 64 is welded or otherwise secured to the remaining leg of the Tee 62 and normally extends back into an underground communication with the pipeline (not shown). Of course, the fluid moving through the pipeline, along with the spheres passing therethrough, enter the Tee 62 simultaneously. In order to preclude passage of the spheres into the conduit 64, it is preferable to provide a grid, screen, or the like 66 within the Tee 52 extending across the opening of the conduit 64 whereby the fluid may pass into the conduit, but the spheres or other objects will be directed into the valve body 12. It is preferable that the plane of the grid 66 be at an angle with respect to the horizontal in order to provide a "downhill" ramp or path for any incoming spheres in order to facilitate movement of the spheres into the valve body 12.

Figure 8:
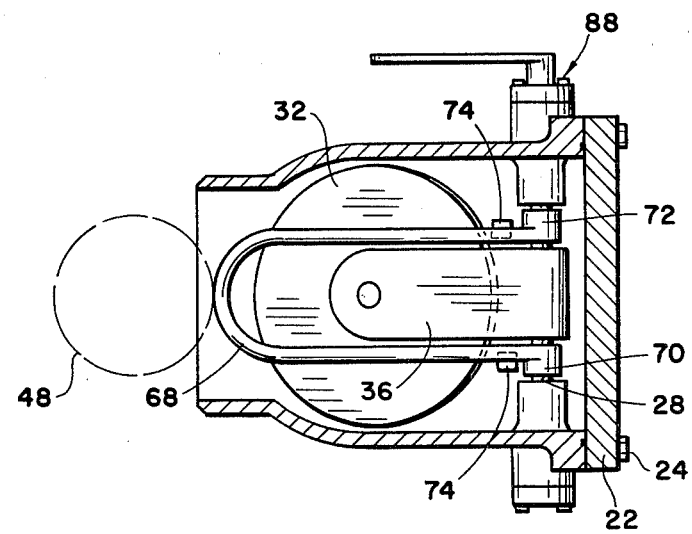
FIG. 8 is a view taken on line 8—8 of FIG. 7.

When the valve 10 is to be installed for a receiving operation, it is preferable to provide a blocking bar 68 in combination with the closure member 32 in order to preclude inadvertent lodging of the spheres within the valve body 12 prior to opening of the valve. It will be readily apparent that any sphere which might become lodged within the valve body 12 during the closed position of the valve would rest on the upper portion of the closure member 32 and render the valve substantially impossible to open. The blocking bar 68 may be of any suitable configuration, but as shown in FIG. 8 is of a substantially U-shaped configuration having aligned bosses 70 and 72 provided on the opposite ends thereof for receiving the pivot shaft 28 therethrough. The bosses 70 and 72 are preferably keyed, or otherwise secured to the outer periphery of the shaft 28 for rotation simultaneously with the closure member 32, thus assuring that the bar 68 will always be positioned in close proximity to the outer surface of the closure member, but preferably extending at a slight angle with respect to the plate thereof, as shown in FIG. 5. This assures that the bar 68 will be in a position for blocking the forward movement of the spheres 48 when the closure member 32 is in a closed position against the valve seat 26. It is also preferable to provide stop members 74 on the legs of the bar 68 which extend downwardly therefrom as viewed in FIG. 5 for positively precluding movement of the block bar 62 in a downward direction beyond the outlet of the Tee, thus further assuring that no sphere will become lodged within the valve body 12.

The valve body 12 is secured to the Tee 62 in such a manner that the port 16 thereof is welded to or otherwise connected to the Tee, and the port 18 is connected with a suitable receiving tube assembly 76, and is in open communication with the interior thereof. The interior of the tube assembly 76 is in communication with the conduit 64 through a suitable bypass line 78 having a shut-off valve 80 interposed therein. When the valve 80 is in an open position, the pressure within the conduit 64 is in communication with the interior of the tube assembly 76 in order that the pressure in the tube will be equal to the pipeline pressure. Of course, when it is desired to relieve the pressure within the tube assembly 76 the valve 80 may be closed for precluding communication between the tube and the conduit 64, as will be hereinafter set forth.

The outer end of the tube assembly 76 is normally provided with an end closure assembly 82 generally similar to the closure means 54 for providing access to the interior of the tube assembly. In addition, the usual blow-down valve 84 is secured to the tube assembly 76 and in communication with the interior thereof for relieving the pressure therein, as is well known. It is also preferable to provide an externally mounted pressure gauge 86 in communication with the interior of the tube assembly 76 for providing a visual indication of the internal pressures therein.

During the normal sphere receiving operation, the valve 80 is usually open in order that the internal pressure of the tube assembly 76 will be equal to the internal pressure of the pipeline. As the spheres 48 approach the Tee 62 or valve 10, the closure member 30 may be opened in order to permit the spheres to move therethrough into the receiving tube 76. As the spheres 48 enter the Tee 62, they will ride along the upper surface of the ramp or grid 66 and into the valve body 12. Any fluid moving along with the spheres will fall through the grid 66 by gravity and be carried along with the remaining fluids passing through the pipeline. The spheres entering the valve body 12 will pass through the port 16 and emerge through the port 18 for dropping by gravity into the receiving tube assembly 76. Of course, the spheres may be stored within the tube until it is desired to remove them.

When it is necessary or desirable to remove the spheres from the tube assembly 76, the valve 10 is closed and the valve 80 is closed for interrupting the communication between the tube 76 and conduit 64. The blow-down valve 84 may be utilized in the usual manner for relieving the internal pressure of the assembly 76, and when the gauge 86 indicates that the pressure within the tube has been sufficiently relieved, the end closure member 82 may be opened in order to retrieve the spheres from the assembly 76. Of course, no additional oncoming spheres can enter the valve 10 since the closure member 30 is closed against the valve seat 26, and the blocking bar 68 precludes entering of any spheres into the valve body. Fluid moving through the line, however, will be free to continue moving through the grid 66 for continued flow through the pipeline.

The closure member 32 is in a normally closed position since gravity causes the disc 32 to seek a normal position against the valve seat 26. However, it is preferable to provide an externally mounted operator means 88 operably connected with the pivot shaft 28 for opening of the closure member 30 when it is desired to admit the spheres 48 into the receiving tube assembly 76. The operation 88 may be of the usual or well known manual type, as shown, or may be of the automatic type as hereinbefore set forth in connection with the launching-type operation for the valve 10.

From the foregoing it will be apparent that the present invention provides a novel valve which may be either a sphere launching valve or a sphere receiving valve. In a sphere launching environment, the valve is interposed in a pipeline in such a manner that oncoming spheres from the launch tube will be admitted into the pipeline one at a time since a particular launcher mechanism is installed within the valve body in the proximity of the valve closure member for positively precluding the release of more than one sphere at a time. In the sphere receiving environment, the valve housing is interposed in the pipeline in a substantially reverse direction with respect to the launching operation installation, and a blocking bar is added in the proximity of the closure member for precluding entry of an oncoming sphere into the valve body when the valve is in a closed position, thus assuring that no internal condition will arise which will lock the valve in an inoperative position. The novel valve solves dual problems in a fluid flow system, and is simple and efficient in operation and economical and durable in construction.

Whereas the present invention has been described in particular relation to the drawings attached hereto, it should be understood that other and further modifications, apart from those shown or suggested herein may be made within the spirit and scope of this invention.

What is claimed is:

1. Sphere launching and receiving valve comprising a valve body of substantially L-shaped configuration and having a first port and a second port in communication with the interior of the valve body, an access port in communication with the interior of the valve body, a removable cover member secured to said access port, a valve seat provided within the valve body in the proximity of one of said ports, valve closure means pivotally secured within said valve body and selectively engageable with the valve seat to provide open and closed positions for the valve, recess means provided in said valve body for receiving the closure means therein during an open position of the valve whereby an unrestricted passageway is provided between the first and second ports, one of said ports being an inlet port and the other of said ports being an outlet port during a sphere launching operation, and the ports providing a reverse function during a sphere receiving operation, and wherein a sphere receiving area is provided in the valve body in the closed position of the closure means, and including blocking bar means secured in the valve body in the proximity of the outer surface of said closure means during a sphere receiving operation to preclude accidental entry of a sphere into the sphere receiving area during a closed position of the valve.

2. Sphere launching and receiving valve as set forth in claim 1 and including launching means pivotally secured within the valve body in the proximity of said inlet port for precluding passage of more than a single sphere through the valve body at a time.

3. Sphere launching and receiving valve as set forth in claim 2 wherein said launching means comprises a substantially L-shaped latch member pivotally secured to the inner periphery of the valve body for movement in one direction by gravity and responsive to engagement by the closure means for movement in an opposite direction.

4. Sphere launching and receiving valve as set forth in claim 3 wherein said latch member comprises a first leg member having the outer end thereof in engagement with the closure means in a closed position of the valve for elimination of interference with any sphere, and a second leg member having the outer end thereof engaged with one sphere in an open position of the closure means for limiting further movement of said one sphere while a leading sphere is free for movement through the open valve during a sphere launching operation.

5. Sphere launching and receiving valve as set forth in claim 1 wherein said blocking bar comprises a substantially U-shaped arm movable simultaneously with the closure means whereby said blocking bar is moved to an out-of-the-way position in the open position of the valve and into a blocking position in the closed position of the valve.

6. Sphere launching and receiving valve as set forth in claim 5 wherein stop means is provided on said blocking bar for positively precluding movement of the blocking bar from the blocking position in the closed position of the valve.

* * * * *

UNITED STATES PATENT AND TRADEMARK OFFICE
CERTIFICATE OF CORRECTION

PATENT NO. : 4,351,079
DATED : September 28, 1982
INVENTOR(S) : John R. Fitzpatrick, et al It is certified that error appears in the above-identified patent and that said Letters Patent are hereby corrected as shown below:

On the title page item [75] Inventor:

Add John Douglas Fitzpatrick as a co-inventor

Signed and Sealed this

Twenty-eighth Day of December 1982

[SEAL]

*Attest:*

GERALD J. MOSSINGHOFF

*Attesting Officer*   *Commissioner of Patents and Trademarks*